UNITED STATES PATENT OFFICE.

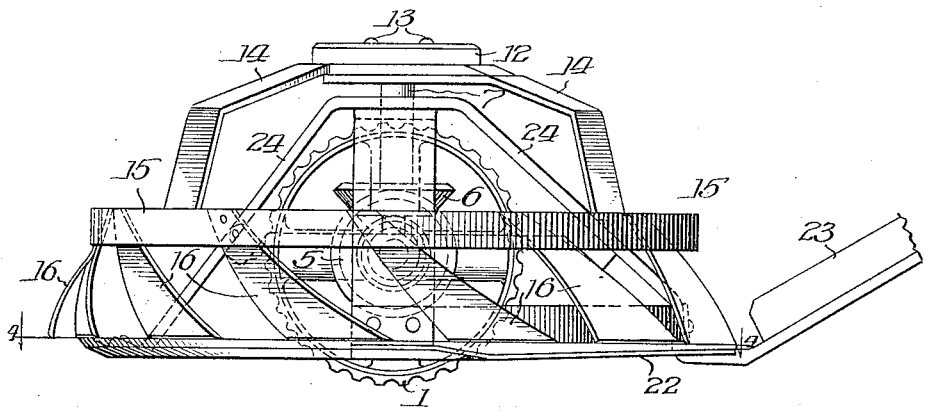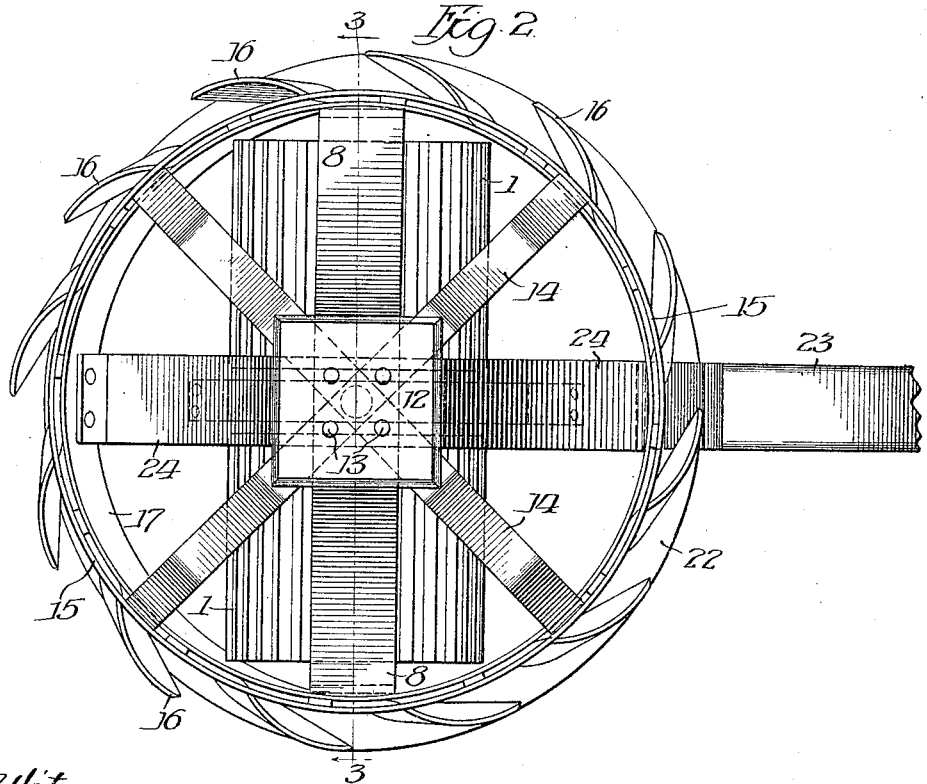

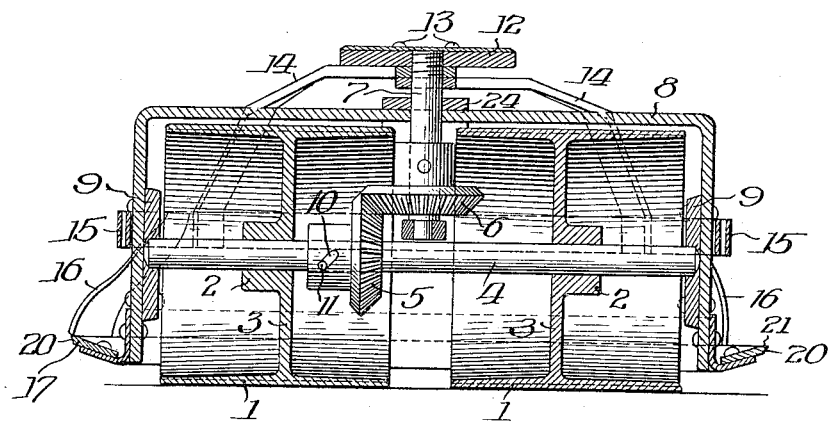
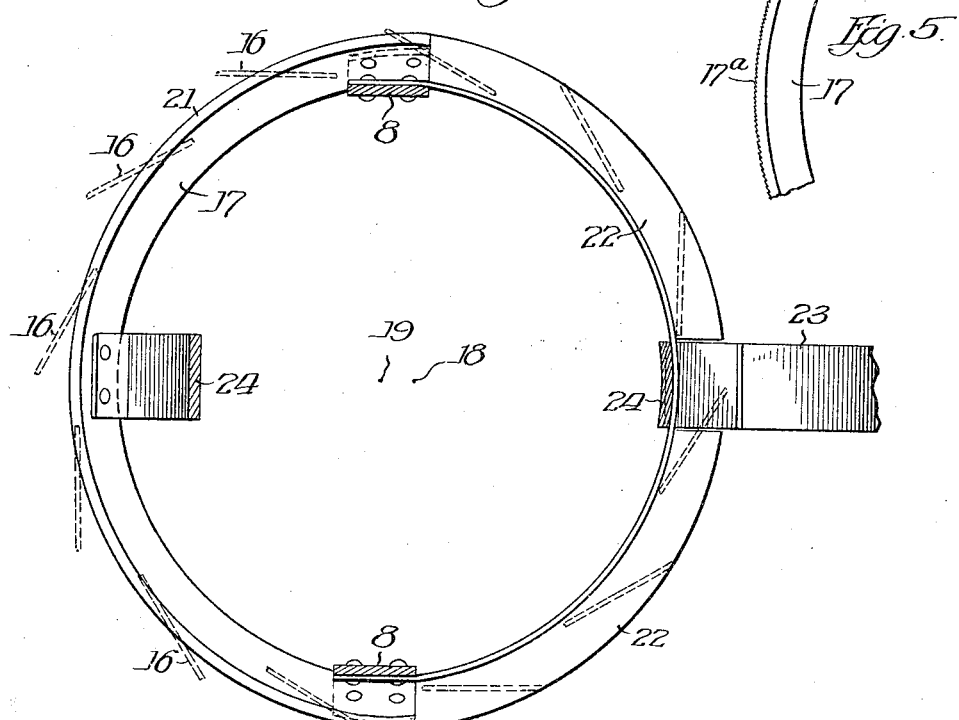

HUBERT H. MONTAGUE, OF TRAVERSE CITY, MICHIGAN.

LAWN-MOWER.

1,153,943.   Specification of Letters Patent.   Patented Sept. 21, 1915.

Application filed March 9, 1914. Serial No. 823,415.

*To all whom it may concern:*

Be it known that I, HUBERT H. MONTAGUE, citizen of the United States, residing at Traverse City, in the county of Grand Traverse and State of Michigan, have invented a certain new and useful Improvement in Lawn-Mowers, of which the following is a full, clear, concise, and exact description.

My invention relates to lawn-mowers, and more particularly to the type in which there is a fixed knife and a series of coöperating knives which revolve about a vertical axis.

One of the objects of my invention is to provide a lawn-mower which will cut a strip of grass equal in width to the entire width of the mower.

Another object of my invention is to provide a mower which is comparatively noiseless in operation.

A further object of my invention is to provide a mower in which the cutting blades have a shearing action in such manner that the cutting operation tends to sharpen rather than to dull the blades.

A further object is to provide a mower which will cut the grass in places which are inaccessible to the usual type of mowers.

A still further object is to provide a mower in which, after the knives have cut the grass, the turf is rolled by the wheels or rollers which constitute driving means for the knives.

These and other objects of my invention and the several features thereof may be more readily understood by reference to the accompanying drawings, in which—

Figure 1 is a side elevation of a mower embodying my invention, the operating handle being shown as broken away; Fig. 2 is a top plan view of the same; Fig. 3 is a section on the line 3—3 of Fig. 2; Fig. 4 is a detailed view in section on the line 4—4 of Fig. 1, of the curved stationary blade and the curved angle-bar to which it is secured, the supporting frame-work thereof being shown in cross-section; and Fig. 5 is a fragmentary detail view of a modified form of the stationary blade.

Like letters of reference denote like parts throughout the several views.

The lawn-mower is provided with two driving wheels, which are shown in the form of hollow rollers 1, 1 arranged end to end and slightly spaced apart. Secured to said rollers, as, for example, to hubs 2 provided upon the interior webs 3, is the axle 4. Carried by said axle 4 is a bevel-gear 5. Meshing with said bevel-gear 5 and driven thereby is a bevel-gear 6, which is secured upon the end of a vertical spindle 7. Said spindle 7 is supported by and has bearings in a cross-bar 8 which extends longitudinally above the rollers and which, at its opposite ends, has depending flanges secured to the end plates 9, which latter are recessed to receive the ends of the axle 4. The bar 8 is thus supported upon the axle 4. The hub of the bevel-gear 5 is provided with an inclined slot 10 which receives a pin 11, secured to the axle 4; whereby, during the forward movement of the rollers 1, 1, the bevel-gear 5 meshes with the bevel-gear 6, but during the rearward movement of said rollers, said bevel-gears are thrown out of engagement.

The upper end of the spindle 7 is provided with a cap-plate 12 to which are secured arms 14 by means of rivets 13 or the like. Said arms extend outwardly and downwardly, and to the lower ends thereof is secured a revolving ring 15, preferably comprising two bands slightly spaced apart and secured together. The ring 15 carries a series of downwardly extending knives 16, the upper ends of said knives being secured between the two bands of the ring 15. The ring 15 and the knives 16 carried thereby are thus arranged to be revolved, the spindle 7 being the center of the axis of revolution thereof.

Coöperating with the revolving knives 16 is a stationary blade 17. Said blade 17 has its opposite ends extending rearward from the middle of the blade and is preferably bent in a semi-circular form as shown most clearly in Fig. 4, the center of curvature thereof being indicated by the point 18. The center of the axis of rotation of the knives 16 is indicated by the point 19, and, as will appear from Fig. 4, the point 19 is forward of the point 18. It follows from this, therefore, as each knife 16 is carried from end to end of the fixed blade 17, that it is first drawn from toe to heel and then from heel to toe over the surface of said blade, as indicated in Fig. 4. This reproduces the well-known stroke used for sharpening a knife and thus the movement of the knives 16 over the surface of the blade 17 tends to sharpen the cutting edges of the knives and blade. While it has been found in practice that the knives successively cut the grass during the above mentioned movement of the knives from toe to heel over the surface of the blade 17, the cutting action of the knives is most efficient while they are being drawn from heel to toe over the surface of the blade 17. At this latter stage the revolving knives gather the grass inwardly and coöperate with the stationary blade to clip or shear the grass. In short the structure is such that the fixed blade 17 lies inward of the cutting portion of the knives 16 as said knives are, as it were, drawn inward from heel to toe over the surface of said fixed blade. As is shown in Fig. 4, the knives 16 each has its cutting edge arranged approximately tangential to a circle having the axis of revolution 19 of said knives as its center. The knives thus intersect the cutting edge of the blade 17 at an acute angle thereto, and as the knives rotate, a shearing action is produced upon the grass which is cut by the knives. In order that the grass may not tend to slip upon the edge of the blade 17, said plate may be provided with a serrated edge 17ª, as shown in Fig. 5. The blade 17 is, as stated, preferably bent into a semi-circular form. Said blade 17, as is shown most clearly in Fig. 3, extends upwardly and forwardly from its back toward its cutting edge. The underside of the cutting edge is beveled, as indicated at 20, and the upper surface of the cutting edge is preferably ground to provide a horizontal portion 21 upon which the knives 16 bear. The ends of the blade 17 are secured to the ends of a curved angle-bar 22, which extends back of the machine. The handle 23 of the machine is secured in any suitable manner to said angle-bar 22. The ends of the angle-bar are riveted to the lower ends of the bar 8 of the frame-work, and in addition to such supporting frame, there is also provided a bracing bar 24, the opposite ends of which are secured to the blades 17 and the angle-bar 22, respectively, and which passes up and over the bar 8.

From the structure of my invention as thus described and as shown in the drawings, it is obvious that a strip of grass may be cut equal to the entire width of the machine, and that the machine may be used for cutting grass in places which are inaccessible to the ordinary type of lawn-mower, as, for example, in cutting grass around trees or shrubs. It is also apparent that in the use of the machine, none of the uncut grass is crushed down by the driving wheels, such driving wheels, on the contrary serving to roll the turf after the grass has been cut. Moreover, since the cutting action is a shearing one, the height of the grass does not seriously interfere with the cutting operation, the machine of my invention being thus free from one of the objections to the ordinary lawn-mower. Moreover, my machine is comparatively noiseless in operation.

While I have shown and described the preferred embodiment of my invention, it is obvious that in certain details it may be modified without departing from the scope thereof as defined in the accompanying claims.

What I claim is:—

1. In a lawn-mower, the combination of a fixed blade having a horizontally disposed cutting edge extending at an angle with respect to the direction of movement of the lawn-mower, and a coöperating horizontally revolving knife which contacts with and projects beyond said cutting edge at an acute angle therewith and is gradually drawn inward relatively thereto during a portion of the revolution of said knife.

2. In a lawn-mower, the combination of a fixed blade having a horizontally disposed cutting edge extending at an angle with respect to the direction of movement of the lawn-mower, and a coöperating revolving knife having a vertical axis of revolution, said knife contacting with said fixed blade and having its cutting edge approximately tangential to a circle having the axis of revolution of said knife as its center.

3. In a lawn-mower, the combination of a fixed blade having a horizontally disposed, continuously curved, cutting edge extending at an angle with respect to the direction of movement of the lawn-mower, and a series of knives mounted to contact with said fixed blade and to revolve in a circular path above said blade, said knives having a vertical axis of revolution eccentric of said curved cutting edge.

4. In a lawn-mower, the combination of a fixed blade having a horizontally disposed, continuously curved, cutting edge extending at an angle with respect to the direction of movement of the lawn-mower, and a series of knives mounted to contact with said fixed blade and to revolve in a circular path above said blade, said knives having a vertical axis of revolution eccentric of said curved cutting edge and said knives each having its cutting edge arranged approximately tangential to said circular path.

5. In a lawn-mower, the combination of a longitudinally, curved fixed blade inclined upwardly and outwardly from its back to its cutting edge, and a series of downwardly extending revolving knives having the cutting edges extending transversely of the edge of said blade at an acute angle thereto and in contact therewith.

6. In a lawn-mower, the combination of an arc-shaped fixed blade inclined upwardly and outwardly from its back to its cutting edge, a series of downwardly extending knives having their cutting edges arranged at an acute angle to the cutting edge of said blade and in contact therewith, and means for revolving said knives upon a vertical axis lying forward of the center of curvature of said fixed blade.

In witness whereof I hereunto subscribe my name this seventh day of March, A. D., 1914.

HUBERT H. MONTAGUE.

Witnesses:
McCLELLAN YOUNG,
GEORGE E. FOLK.

Copies of this patent may be obtained for five cents each, by addressing the "Commissioner of Patents, Washington, D. C."